Patented Nov. 23, 1937

2,099,708

UNITED STATES PATENT OFFICE 2,099,708

THERAPEUTIC PRODUCT AND METHOD OF MAKING SAME

Elwood A. Sharp, Detroit, Mich., assignor to Parke, Davis & Company, Detroit, Mich., a corporation of Michigan No Drawing. Application March 29, 1933, Serial No. 663,426

10 Claims. (Cl. 167—74)

This invention relates to a therapeutic product having anti-anaemic properties and relates further to methods for obtaining this product.

There is present in the stomach and duodenal tissues of animals, particularly of hogs, an active principle having anti-anaemic properties, and this invention provides for the concentration of this active principle to thus obtain a product which may be utilized in the treatment of both secondary and pernicious anaemia. The product obtained has been found to actuate to a high and satisfactory degree the required erythropoiesis (stimulation of the growth of red blood cells) essential to the production of a remission in pernicious anaemia. The present invention provides for the obtaining of this product either dry or in solution, the product in either case being highly concentrated.

To obtain a product having the above mentioned properties, several methods may be utilized, according to the teachings of this invention. One method consists in first desiccating the material containing the active principle desired to remove the water from the same. The material utilized may be fresh whole stomachs or duodenal tissue, and while this material may be obtained from any animals, it is preferable to obtain the same from hogs. The material is freed from extraneous tissue, minced finely and then desiccated by subjecting the same to a high vacuum at a low temperature. The vacuum is preferably as high as can be obtained with ordinary commercial vacuum pumps, and the vacuum is preferably maintained as high as 29 inches of mercury, although this exact figure is not essential. The temperature used is as low as can be used at the specified vacuum to commercially dehydrate the material. Water coils may, if desired, be utilized for heating the material, the temperature in the coils being preferably maintained between 40° C. and 60° C., although the actual temperature of the material is somewhat lower, being approximately 37° C., due to the cooling effect incident to the evaporation of moisture from the tissue. In the commercial desiccation of large quantities of material, desiccation is carried on for several hours, sometimes up to twelve hours. By maintaining the high vacuum and low temperature, the desiccation can be carried out without destroying the active principle.

The water-free product is then ground finely and subjected to treatment with a fat solvent (preferably purified petroleum ether in a Soxhlet apparatus). The fat-free product is spread on trays and subjected to circulating air until all traces of petroleum ether have been removed.

To this desiccated defatted product there is added water, preferably to the amount of three and one-half to four times the weight of the product. The amount of water may be increased if desired, although the greater quantity of water utilized, the more dilute will be the solution formed. The mixture of the product and water may be agitated for some three to four hours or may be permitted to stand over night with occasional stirring. The solution thus formed is separated from the undissolved product either by pressure or by a centrifuge, the liquid thus obtained containing the active principle from the material treated. This method produces a solution containing in a highly concentrated form an active principle having the physiological property of actuating erythropoiesis.

If desired, there may be substituted for the water used in the above described method, a solution containing approximately 15% alcohol. The process is otherwise as above described, the alcohol acting to prevent bacterial putrefaction. Whether the alcohol solution or water is utilized, there is obtained a colloidal solution having the physiological property of combating anaemia.

A second process consists in treating the desiccated and defatted product with a salt solution in place of the water or alcohol solution. This process consists in adding to the desiccated defatted product about four times by weight of an isotonic salt solution. This mixture may be stirred for three or four hours, and the mixture then subjected to the action of a high speed centrifuge. To the solids left in the centrifuge, there is added a quantity of water, approximately one quarter of the amount of isotonic salt solution originally utilized, and this mixture is also centrifuged. The liquids obtained from the two centrifuging operations contain the active ingredients desired. In place of the centrifugal separation of the liquid from the solids, this separation might be effected by a cider press or filter press.

While the solution thus obtained may itself be utilized, this solution or filtrate may be concentrated as follows. The filtrate is concentrated by a vacuum shelf drier, the solution being concentrated to dryness at a low temperature with a high vacuum. The vacuum is preferably as high as that obtainable commercially, and the temperature of the product is maintained between 90 and 100° F. The dry product thus obtained is approximately four times as potent as the dry product originally mixed with the salt solution, the product constituting 4% to 5% by weight of the initial animal tissue treated. Thus this process provides for the obtaining of a highly concentrated dry form of product.

A further method which may be utilized consists in first desiccating and defatting the animal tissue to obtain the dry product such as that previously described. This is treated with water, as above described, to obtain a filtrate or solution containing the active principle desired. To this there is added three to four volumes of 95% alcohol, this forming a precipitate which is separated from the liquid by a filter or a centrifuge. The solid is discarded, and the liquid is treated in vacuum to remove the alcohol and to reduce the same to about 15% of its original volume. The liquid thus obtained is entirely clear, contains the active ingredient in highly concentrated form, and is suitable for oral administration.

If desired, the filtrate to which the alcohol is added as above described might first be concentrated in vacuum while being maintained at substantially body temperature until the filtrate becomes a thick viscous liquid. The alcohol may then be added to this viscous liquid and the precipitate separated from the same and the liquid concentrated in the manner above described. The resulting product is a clear solution which contains the active ingredients in highly concentrated form.

A still further method which may be utilized consists in desiccating and defatting the animal tissues to first obtain a dry product as above described. This product is treated with water, as also previously described, to obtain a filtrate which contains the active ingredients. This filtrate is then concentrated in vacuum at a low temperature, preferably about body temperature, until the same becomes a thick viscous liquid. This concentrate is then dialized through a semipermeable membrane which may be an animal or artificial membrane. The membrane utilized is preferably as porous as may be utilized while still obtaining a clear solution. By this dializing process, there is obtained a clear solution which contains in highly concentrated form the active ingredients desired.

Instead of first dehydrating and defatting the animal tissue, as discussed in the above described methods, the animal tissue, such as hogs' stomachs or duodenum, may be directly mixed with a salt solution and allowed to stand for from three to ten hours. This mixture may then be treated in a centrifuge to obtain a solution which it has been found contains the active ingredients desired.

Instead of utilizing water, alcohol, acetone or very dilute acid solutions might be utilized. Such acids as hydrochloric, sulphuric or acetic have been found in dilute solutions to effect the desired extraction. With this last described process it will be apparent that a clear solution may be obtained directly from the raw material without the intervening steps described in connection with the other processes. The solution will contain in a highly concentrated form the active principle of the raw material which has the property of combating pernicious and secondary anaemia.

A still further process which may, if desired, be utilized consists in desiccating and defatting the raw material to obtain a dry product which contains the active principle desired. The active principle may be extracted from a quantity of this dry product by water, as previously described, and the filtrate thus obtained may be mixed with the remainder of the dry product to produce a product which is not quite as concentrated as the filtrate, but is obviously more concentrated than the original dry product obtained.

For use in the treatment of secondary anaemia it has been found that iron, when mixed with any of the products heretofore described, produces excellent results. While any one of the products disclosed may be used as the basis with which the iron may be mixed, there will be described by way of illustration, a mixture formed of the desiccated defatted animal tissue with iron.

In producing this mixture the desiccated defatted animal tissue is thoroughly mixed with, for example, powdered ferric citrate and this mixture is then granulated with water and gelatin solution. The resulting mixture is placed in a drier, and after being thoroughly dried is broken up to a uniform granulation. This mixture, when administered, has been found to have the physiological property of efficiently combating secondary anaemia.

While in the example given, powdered ferric citrate is given as the form of iron utilized, it is to be understood that the mixture is not limited to this ingredient. There may be substituted for the ferric citrate, ferrous carbonate, iron ammonium citrate, iron sodium citrate, reduced iron, or any original iron salt used in therapeutics. Iron chloride, iron sulphate and like iron salts may be utilized if desired, although these latter are astringent in action and therefore do not produce as palatable a mixture as do other iron salts. In any event, a suitable iron salt may be mixed with the desiccated defatted animal tissue to provide a product having decided properties for use in combating secondary anaemia.

From the above it will be apparent that the invention provides for the production of a therapeutic product which contains in highly concentrated form a substance having the physiological property of combating anaemia. This product may be obtained as a dry substance or may be obtained in solution. While certain specific examples have been described in detail, it is to be understood that the description is illustrative only and is not definitive of the limits of the invention. The right is reserved to make such changes in the form of the product and the steps of the method as will fall within the purview of the attached claims.

What I claim as my invention is:

1. A product derived from animal tissue of the class consisting of the stomach and duodenum, which product is effective in combating anemia, contains a thermolabile, water-soluble, active principle, has not less than approximately four times the anti-anemia potency of desiccated defatted hog stomach, is free from large amounts of said animal tissue and when in solid form is soluble in water and has a weight less than 5% of the original animal tissue from which it is derived.

2. A product derived from stomach tissue, which product is effective in combating anemia, contains a thermolabile, water-soluble, active principle, has not less than approximately four times the anti-anemia potency of desiccated defatted hog stomach, is free from large amounts of said animal tissue and when in solid form is soluble in water and has a weight less than 5% of the original animal tissue from which it is derived.

3. A product derived from duodenum tissue, which product is effective in combating anemia, contains a themolabile, water-soluble, active principle, has not less than approximately four times the anti-anemia potency of desiccated defatted hog stomach, is free from large amounts of said animal tissue and when in solid form is soluble in water and has a weight less than 5% of the original animal tissue from which it is derived.

4. An anti-anemia product derived from duodenum tissue of animals, said product being somewhat soluble in alcohol and practically insoluble in petroleum ether, and containing a thermolabile, water-soluble, active principle effective in combating anemia and actuating erythropoiesis.

5. An anti-anemia product comprising desiccated defatted duodenum tissue containing an active principle having the physiological property of combating anemia and actuating erythropoiesis.

6. The process of obtaining a product having anti-anemia potency comprising treating a product containing animal tissue of the class consisting of stomach and duodenum and also containing a thermolabile active principle with a liquid solvent capable of extracting said active principle, said solvent comprising water, maintaining the temperature below about 50° C. to prevent any substantial inactivation of said principle, and separating the liquid extract from the insoluble residue.

7. The process of obtaining a product having anti-anemia potency comprising treating a product containing animal tissue of the class consisting of stomach and duodenum and also containing a thermolabile active principle with a liquid solvent capable of extracting said active principle, said solvent comprising water having a small amount of acid dissolved therein, maintaining the temperature below about 50° C. to prevent any substantial inactivation of said principle, and separating the liquid extract from the insoluble residue.

8. The process of obtaining a product having anti-anemia potency comprising treating a product containing animal tissue of the class consisting of stomach and duodenum and also containing a thermolabile active principle with a liquid solvent capable of extracting said active principle, said solvent comprising water having dissolved therein a substance of the class consisting of alcohol and acetone, maintaining the temperature below about 50° C. to prevent any substantial inactivation of said principle, and separating the liquid extract from the insoluble residue.

9. The process of obtaining a product having anti-anemia potency comprising treating a product containing animal tissue of the class consisting of stomach and duodenum and also containing a thermolabile active principle with a liquid solvent capable of extracting said active principle, said solvent comprising an aqueous solution of sodium chloride, maintaining the temperature below about 50° C. to prevent any substantial inactivation of said principle, and separating the liquid extract from the insoluble residue.

10. The process of obtaining a product having anti-anemia potency comprising treating defatted tissue of the class consisting of the stomach and duodenum with a liquid solvent comprising water, maintaining the temperature below about 50° C. to prevent any substantial inactivation of the anti-anemia principle, and separating the liquid extract from the insoluble residue.

ELWOOD A. SHARP.